(59.)
J. W. SANDS & B. F. WALTERS.
Improvement in Pea Nut Shellers.
No. 122,856.           Patented Jan. 16. 1872.
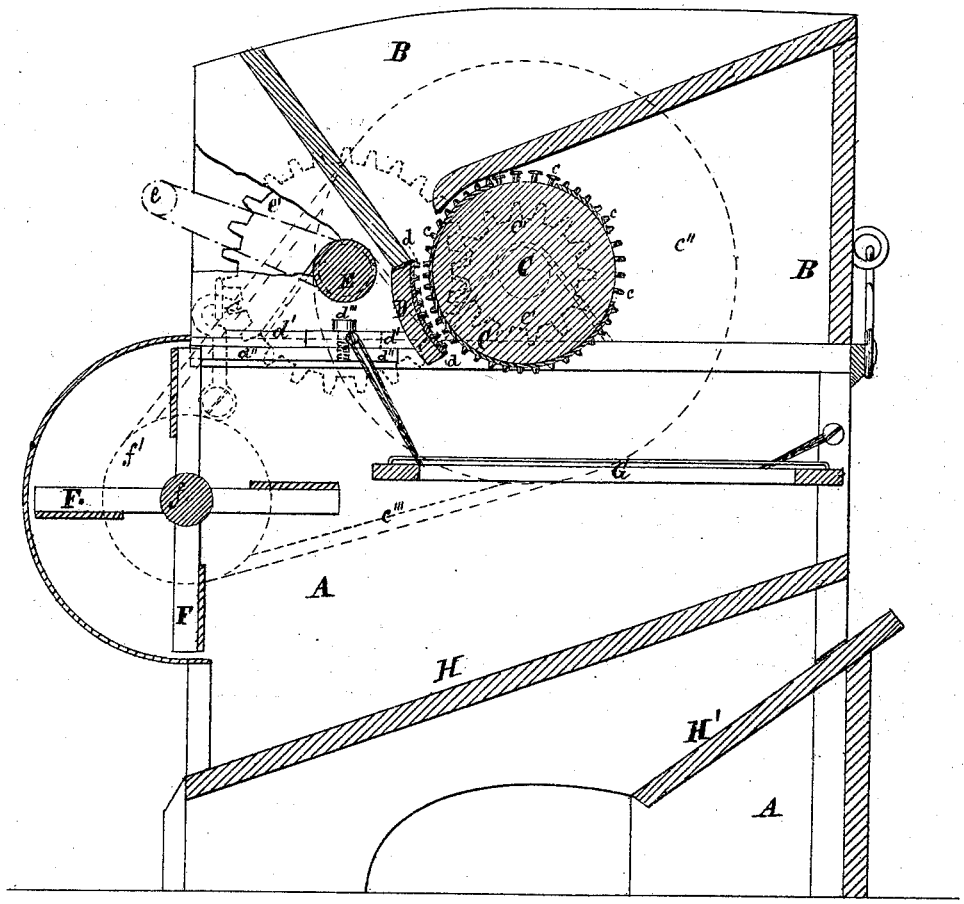
Witnesses:
G. Matthys.
John C. Lemon
Inventor:
Jos. W. Sands.
B. F. Walters.
Per
Attorneys.

UNITED STATES PATENT OFFICE.

JOSEPH W. SANDS AND BENJAMIN F. WALTERS, OF NORFOLK, VIRGINIA.

IMPROVEMENT IN PEA-NUT SHELLERS.

Specification forming part of Letters Patent No. 122,856, dated January 16, 1872.

Specification describing a Machine for Shelling Pea-Nuts, invented by JOSEPH W. SANDS and BENJAMIN F. WALTERS, of Norfolk, in the county of Norfolk and State of Virginia.

The invention will be first hereinafter fully described and then clearly pointed out in the claim.

The drawing is a longitudinal section of the organized machine.

A represents the frame, and B a removable hopper. C is a rotating cylinder provided with the teeth $c$, and D a concave provided with corresponding teeth $d$, and concentric with the cylinder. $d^1 d^1$ are slotted arms, which hold the concave, are adjustable on the supports $d^2 d^2$, and are clamped by set-screws $d^3 d^3$. E is a shaft, provided with hand-crank $e$ and wheel $e'$, while $c^1$ is the pinion or axle of the cylinder. $c^2$ is a pulley on extreme end of cylinder-shaft, which drives (by belt $c^3$) the fan-pulley $f'$. F is a wing-fan, and $f$ its shaft. G is a shaking sieve; H, an inclined plane thereunder; and H', an adjustable incline under the latter.

The mode of operation is as follows: The pea-nuts, being poured into hopper B, fall between the rotary cylinder C and stationary concave D. The shells being crushed and caused to fall off, the kernels and shells both drop upon the shaking sieve G. Here the action of the fan carries the shells out in front, while the gravity of the kernels causes them to go through and upon the incline H, whence they are dropped into some receptacle prepared for them. The lighter and more shriveled kernels that are carried out in the front, falling near the mouth, strike the second incline H', and are conducted into a second receptacle.

Having thus described our invention, what we claim as new, and desire to secure by Letters Patent, is—

The machine herein described for shelling pea-nuts, consisting of hopper B, rotating toothed cylinder C $c$, adjustable stationary toothed concave D $d$, fan F, shaking sieve G, and inclines H H', all constructed and arranged as described.

J. W. SANDS.
B. F. WALTERS.

Witnesses:
J. EASTHAM,
DANIEL SLACK. (59)